United States Patent
Mestre Pons et al.

(10) Patent No.: US 8,929,495 B2
(45) Date of Patent: Jan. 6, 2015

(54) METHOD FOR EQUALIZING FILTERBANK MULTICARRIER (FBMC) MODULATIONS

(71) Applicant: Fundació Centre Tecnològic de Telecomunicacions de Catalunya, Barcelona (ES)

(72) Inventors: Francesc Xavier Mestre Pons, Barcelona (ES); Marc Majoral Ramoneda, Barcelona (ES); Stephan Pfletschinger, Barcelona (ES)

(73) Assignee: Fundacio Centre Technologic de Telecomunicacions de Catalunya, Barcelona (ES)

( * ) Notice: Subject to any disclaimer, the term of this patent is extended or adjusted under 35 U.S.C. 154(b) by 42 days.

(21) Appl. No.: 13/847,020

(22) Filed: Mar. 19, 2013

(65) Prior Publication Data

US 2014/0286384 A1    Sep. 25, 2014

(51) Int. Cl.
H04B 1/10       (2006.01)
H04L 27/01     (2006.01)

(52) U.S. Cl.
CPC .................................. *H04L 27/01* (2013.01)
USPC ........................... 375/350; 375/329; 375/316

(58) Field of Classification Search
CPC ....................................................... H04B 7/086
See application file for complete search history.

(56) References Cited

U.S. PATENT DOCUMENTS

| | | | |
|---|---|---|---|
| 2003/0147655 A1* | 8/2003 | Shattil ........................... | 398/182 |
| 2007/0188381 A1* | 8/2007 | Bocquet et al. ............... | 342/377 |
| 2007/0258353 A1* | 11/2007 | Okello ........................... | 370/204 |
| 2008/0225689 A1* | 9/2008 | Bickerstaff et al. ........... | 370/208 |
| 2008/0273617 A1* | 11/2008 | Lundby et al. ................ | 375/260 |

OTHER PUBLICATIONS

Baltar, Leonardo G. et al., "MMSE Subchannel Decision Feedback Equalization for Filter Bank Based Multicarrier System," Institute for Circuit Theory and Signal Processing Technische, Universitat Munchen, copyright 2009 IEEE, pp. 2802-2805.

Duhamel, P. and M. Vetterli, "Fast Fourier Transforms: A Tutorial Review and a State of the Art," Signal Processing 19 (1990) pp. 259-299, copyright 1990.

Farhang-Boroujeny, Behrouz and Lekun Lin, "Analysis of Post-Combiner Equalizers in Cosine-Modulated Filterbank-Based Transmultiplexer Systems," IEEE Transactions on Signal Processing, vol. 51, No. 12, Dec. 2003, pp. 3249-3262.

Ihalainen, Tero et al., "Channel Equalization in Filter Bank Based Multicarrier Modulation for Wireless Communications," EURASIP Journal on Advances in Signal Processing, vol. 2007, Article ID 49389, 18 pages.

(Continued)

*Primary Examiner* — Santiago Garcia
(74) *Attorney, Agent, or Firm* — Vedder Price P.C.

(57) ABSTRACT

A method for equalizing the received signal in communications based on filterbank multicarrier modulations and, more particularly, to such a method and system especially advantageous in situations where the channel frequency selectivity is exceptionally high. The method significantly improves the performance of traditional filterbank equalization algorithms based on finite impulse response filters at the output of the receive filterbank. Furthermore, the system consists of multiple parallel stages, the number of which can be tuned to achieve a good compromise between performance and computational complexity. Thanks to this modular structure, and to the fact that most of the architecture can be efficiently implemented using fast Fourier transforms, the system presents a very low computational complexity compared to more traditional equalizers for filterbank multicarrier modulations.

12 Claims, 4 Drawing Sheets

(56) References Cited

OTHER PUBLICATIONS

Karp, T. And N.J. Fliege, "MDFT Filter Banks with Perfect Reconstruction," Hamburg University of Technology, Telecommunications Institute, Hamburg, Germany, copyright 1995 IEEE, pp. 744-747.

Le Floch, Bernard et al., "Coded Orthogonal Frequency Division Multiplex," Proceedings of the IEEE, vol. 83, No. 6, Jun. 1995, pp. 982-996.

Lin, Hao et al., "Equalization with Interference Cancellation for Hermitian Symmetric OFDM/OQAM Systems," France Telecom, Research and Development Division, Cedex, France, copyright 2008 IEEE, pp. 363-368.

Nedic, Slobodan and Nenad Popovic, "Per-Bin DFE for Advanced OQAM-based Multi-Carrier Wireless Data Transmission Systems," NEC USA, CCRL, copyright 2002 IEEE, pp. 38-1 through 38-6.

Nguyen, Truong Q. and R. David Koilpillai, "The Theory and Design of Arbitrary-Length Cosine-Modulated Filter Banks and Wavelets, Satisfying Perfect Reconstruction," IEEE Transactions on Signal Processing, vol. 44, No. 3, Mar. 1996, pp. 473-483.

Sandberg, Stuart D. and Michael A. Tzannes, "Overlapped Discrete Multitone Modulation for High Speed Copper Wire Communications," IEEE Journal on Selected Areas in Communications, vol. 13, No. 9, Dec. 1995, pp. 1571-1585.

Siohan Pierre et al., "Analysis and Design of OFDM/OQAM Systems Based on Filterbank Theory," IEEE Transactions on Signal Processing, vol. 50, No. 5, May 2002, pp. 1170-1183.

Vandendorpe, Luc et al., "Fractionally Spaced Linear and Decision-Feedback Detectors for Transmultiplexers," IEEE Transactions on Signal Proceesing, vol. 46, No. 4, Apr. 1998, pp. 996-1011.

Waldhauser, Dirk S. et al., "MMSE Subcarrier Equalization for Filter Bank Based Multicarrier Systems," Technische Universitut Munchen, Institute for Circuit Theory and Signal Processing, Munchen, Germany, copyright 2008 IEEE, pp. 525-529.

Wiegand, Thomas and Norbert J. Fliege, "Equalizers for Transmultiplexers in Orthogonal Multiple Carrier Data Transmission," Proc. EUSIPCO 1996, Trieste, Italy, 4 pages.

\* cited by examiner

METHOD FOR EQUALIZING FILTERBANK MULTICARRIER (FBMC) MODULATIONS

FIELD OF THE INVENTION

The present invention relates to a method for signal equalization in filterbank based multicarrier communications, which is especially useful in communications through highly frequency selective channels.

STATE OF THE ART

Filterbank multicarrier (FBMC) modulations have been proposed as spectrally efficient alternatives to the classical cyclic prefix orthogonal frequency-division multiplexing (CP-OFDM) modulation. Two are the main advantages of FBMC modulations with respect to OFDM: on the one hand, they do not require the presence of a cyclic prefix; on the other, they can be combined with pulse shaping, which guarantees a well-localized spectral occupancy and prevents out-of-band emissions. These two features result in a much more efficient multicarrier modulation, which makes better use of the available spectral resources.

Unfortunately FBMC modulations present an important drawback that has traditionally prevented their widespread application in wireless scenarios, namely their lack of robustness against channel frequency selectivity [B. L. Floch, M. Alard, and C. Berrou, "*Coded orthogonal frequency division multiplex*," Proceedings of the IEEE, vol. 83, pp. 982-996, 1995]. It is well known that multipath generates inter-symbol and inter-carrier interference at the receiver, and this effect cannot be compensated by single tap per-subcarrier equalizers (as it is the case in traditional OFDM).

So far, a lot of research has been devoted to the study of specific equalization techniques for different filterbank multicarrier architectures, see e.g. [T. Ihalainen, T. H. Stitz, M. Rinne, and M. Renfors, "*Channel equalization in filter bank based multicarrier modulation for wireless communications*," EURASIP Journal on Advances in Signal Processing, vol. 2007, pp. 1-18, 2007.], [H. Lin, C. Lele, and P. Siohan, "*Equalization with interference cancellation for hermitian symmetric OFDM/OQAM systems*". in Proceedings of the IEEE International Symposium on Power Line Communications and Its Applications, ISPLC 2008., pp. 363-368], [L. Baltar, D. Waldhauser, and J. Nossek, "*MMSE subchannel decision feedback equalization for filter bank based multicarrier systems*", in Proceedings of the IEEE International Symposium on Circuits and Systems, ISCAS 2009., 2009, pp. 2802-2805] or [P. Siohan, C. Siclet, and N. Lacaille, "*Analysis and design of OFDM/OQAM systems based on filterbank theory*", IEEE Transactions on Signal Processing, vol. 50, no. 5, pp. 1170-1183, May 2002.]. However, most of all current transceivers for filterbank-based multicarrier (FBMC) modulations obviate this distortion and simply act as if perfect reconstruction conditions were always met. Here, we propose an equalizer that effectively overcomes the limitations of current filterbank equalizers.

The equalization of FBMC signals is a topic that has been extensively explored in the literature. Classical approaches have been based on the direct application of traditional equalization schemes to the FBMC signal model in its full the time-frequency generality: linear filtering schemes in the time-frequency domain [S. Sandberg and M. Tzannes, "*Overlapped discrete multitone modulation for high speed copper wire communications*", IEEE Journal on Selected Areas in Communications, vol. 13, no. 9, pp. 1571-1585, Dec. 1995], [T. Wiegand and N. Fliege, "*Equalizers for transmultiplexers in orthogonal multiple carrier data transmission*", in Proceedings of the European Signal Processing Conference, Trieste, Italy, 1996], [B. Farhang-Boroujeny and L. Lin, "*Analysis of post-combiner equalizers in cosine-modulated filterbank-based transmultiplexer systems*", IEEE Transactions on Signal Processing, vol. 51, no. 12, pp. 3249-3262, Dec. 2003.], fractionally spaced linear and decision feedback equalizers at the input of the receiver [L. Vandendorpe, L. Cuvelier, F. Deryck, J. Louveaux, and O. van de Wiel, "*Fractionally spaced linear and decision-feedback detectors for transmultiplexers*", IEEE Transactions on Signal Processing, vol. 46, no. 4, pp. 996-1010, Apr. 1998], decision feedback prior to detection [H. Lin, C. Lélé, and P. Siohan, "*Equalization with interference cancellation for hermitian symmetric OFDM/OQAM systems*", in Proceedings of the IEEE International Symposium on Power Line Communications and Its Applications, 2008, pp. 363-368], among others. These approaches typically suffer from a high computational complexity due to the fact that the signal must be processed or filtered along both time and frequency domains. To overcome this, more recent studies have proposed per-subcarrier equalization, based on banks of filters independently operating at each subcarrier but usually designed by taking into account the effect of adjacent subcarriers [T. Ihalainen, T. H. Stitz, M. Rinne, and M. Renfors, "*Channel equalization in filter bank based multicarrier modulation for wireless communications*", EURASIP Journal on Advances in Signal Processing, vol. 2007, pp. 1-18, 2007], [D. Waldhauser, L. Baltar, and J. Nossek, "*MMSE subcarrier equalization for filter bank based multicarrier systems*", in Proceedings of the IEEE 9th Workshop on Signal Processing Advances in Wireless Communications, 2008, pp. 525-529], [L. Baltar, D. Waldhauser, and J. Nossek, "*MMSE subchannel decision feedback equalization for filter bank based multicarrier systems*", in Proceedings of the IEEE International Symposium on Circuits and Systems, ISCAS 2009., pp. 2802-2805], [S. Nedic and N. Popovic, "*Per-bin DFE for advanced OQAM-based multi-carrier wireless data transmission systems*", in Proceedings of the International Zurich Seminar on Broadband Communications, 2002, pp. 38-1-38-6].

These approaches are much more affordable from the computational point of view but are inherently suboptimal because they do not consider the full structure of the time-frequency signal model.

SUMMARY OF THE INVENTION

It is a first object of the present invention to provide a method for equalizing filterbank based multicarrier modulations (FBMC) signals, characterised in that it comprises the steps of:
   a.—serial-to-parallel converting the received signal at a serial-to-parallel converter into a first plurality (M) of parallel streams of subcarriers;
   b.—processing each subcarrier of the first plurality (M) of parallelized subcarrier signals by a second plurality (K) of parallel second filterbanks; and
   c.—weighting the output of said K parallel second filterbanks with weights in order to form a new set of M signals.

According to a further feature of the present invention, the said processing of the subcarrier signals is performed using a successive time-domain derivative of an original filter in each corresponding filterbank, hereinafter referred to as "prototype".

In an embodiment of the present invention, the second parallel filterbanks are constructed using an approximation to the time-domain derivatives of the original prototype.

Preferably, each filterbank is constructed using a polyphase network employing an FFT or IFFT operation.

According to another feature of the present invention, the method comprises the step of further processing and/or equalizing the signals that result after combining the outputs of the K parallel second filterbanks. The said equalization associated with a subcarrier my consists of: a filtering operation; a single tap multiplication by an appropriate weight; and/or a single tap multiplication by the inverse of the channel frequency response at the subcarrier frequency.

In the latter case, weights used to combine the output from the K parallel first filterbanks (422, 422', 422'', ... ) of the M signals in each one is fixed for one filterbank and is allocated a value defined by the expression:

$$a_k(m) = -\frac{1}{H(f_m)} \sum_{r=0}^{k-1} \frac{(-j)^{k-r}}{(k-r)!} H^{(k-r)}(f_m) a_r(m)$$

for the generic $k^{th}$ filterbank, wherein H(fm) denotes the channel frequency response at the $m^{th}$ subcarrier frequency, and $H^{(k)}$(fm) denotes the $k^{th}$ frequency domain derivative of the channel response at the $m^{th}$ subcarrier frequency.

Here, H(fm) and $H^{(k)}$(fm), k=1, ... , K may be replaced by estimations or approximations thereof. The m subcarrier output of the $k^{th}$ filterbank can be multiplied by the weight $a_k$(m), k=1, ... , K, m=1, ... , M, and where the resulting signals are added on a per-subcarrier basis.

According to an embodiment, the second plurality (K) of parallel second filterbanks is fixed beforehand according to the channel frequency response.

The present invention is able to overcome traditional equalizing methods (either based on per-subcarrier FIR equalization or based on linear filtering schemes in the time-frequency domain) achieving a substantial reduction in both computational complexity and output distortion power.

As it is stated, the proposed method of FBMC signal equalization comprises the processing of the received in a number of parallel filterbanks, this number being hereinafter denoted by "K". Each stage operates independently in parallel and basically filters the input signal using a filterbank constructed from the derivatives of the original receive prototype pulse in the time domain. The output of all these stages is then downconverted (e.g. transformed via FFT/IFFT) and properly combined at the subcarrier level. The proposed architecture is able to recover the distortion-free signal up to a very small error, much lower than the error achieved by other traditional FBMC equalization methods.

The proposed method for equalizing the FBMC signal comprises the steps of: receiving a signal and distribute it into K parallel stages; processing the signal at each parallel stage by a stage-specific filterbank; downconverting the signal at each parallel stage; combining the signals at the K stages using an appropriate set of weights and optionally applying a traditional FBMC equalizer.

The present invention also provides a system which comprises means adapted for carrying out the steps of the method, as well as a computer program comprising computer program code means adapted to perform the steps of the method when said program is run on a computer, a digital signal processor, a field-programmable gate array, an application-specific integrated circuit, a micro-processor, a micro-controller, or any other form of programmable hardware.

According to a second object of the present invention, it is disclosed a computer program comprising computer program code means adapted to perform the steps of the aforesaid method when said program is run on a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the method of the present invention, a set of attached drawings is provided. Said drawings form an integral part of the description and illustrate a preferred embodiment of the invention, which should not be interpreted as restricting the scope of the invention, but just as an example of how the invention can be embodied. In the attached drawings:

FIG. 1 shows a block diagram of the typical communication scenario where the present invention could be applied to;

DESCRIPTION OF PREFERRED
EMBODIMENTS OF THE INVENTION

Figure 1:
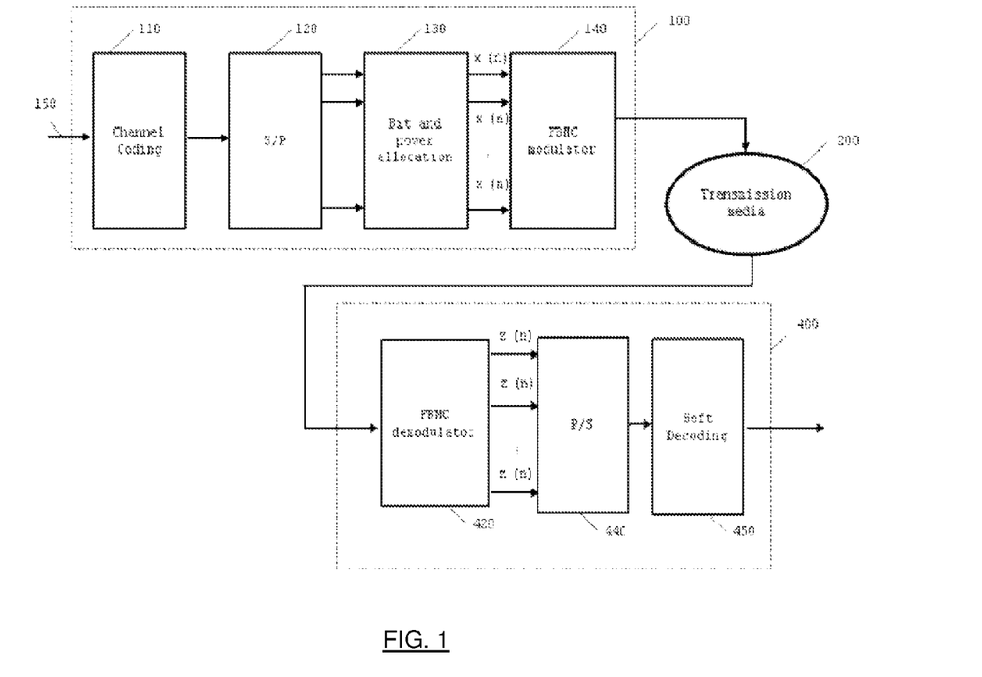

The implementation of the present invention can be carried out according to the setting illustrated in FIG. 1:

1. At the input of a transmitter (100), a stream of bits (150) is coded according to some codebook (110) and then serial-to-parallel converted into M different branches at the S/P converter (120).

2. For each of these M branches, the bit stream is mapped into a sequence of complex symbols obtained from a certain constellation at a mapping block (130). The selected constellation may be different for each branch, and the null constellation can also be used (in which case, no bit is allocated to a particular branch). In addition, each symbol stream is weighted with some amplification factor which may be different at each branch. The decision on which constellation and power factor is used for each of the M branches is made according to some channel state information that is obtained at the receiver.

3. The M parallel symbol streams obtained in the previous operation $(x_1(n), \ldots, x_M(n))$ are then modulated according to a filterbank multicarrier (FBMC) modulation at FBMC modulator (140) and the resulting signal is sent through a transmission media (200).

4. At the receiver (400), the inverse operations are carried out. First, the signal is demodulated at FBMC demodulator (420) into M parallel symbol streams ($y_1(n), \ldots, y_M(n)$) which under ideal conditions would coincide with the original symbol stream $x_1(n), \ldots, x_M(n)$. However, due to the presence of noise and a non-ideal channel, these symbols will be distorted versions of the original ones.

5. At the exit of the FBMC demodulator (420) the M parallel symbols streams ($y_1(n), \ldots, y_M(n)$) undergo a parallel to serial conversion at P/S converter (440) and the serial signal exiting therefrom is submitted to soft decoding at decoder (450).

Figure 2:
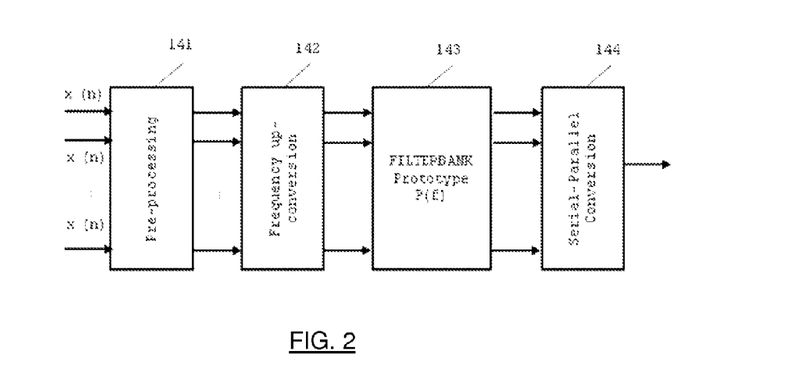
FIG. 2 shows a block diagram of a preferred embodiment of the filterbank based multicarrier communications (FBMC) modulator of FIG. 1 according to the present invention.
Figure 5:
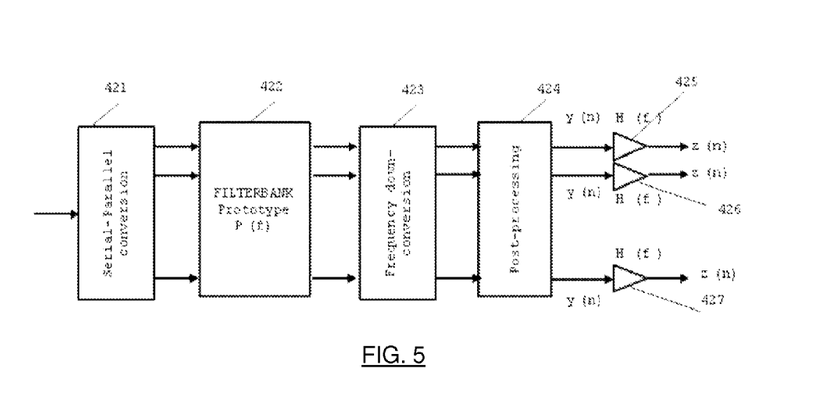
FIG. 5 shows a block diagram of the conventional FBMC demodulator, according to the prior art.

The structure of the FBMC modulator (140) and classical demodulator (420) are shown in FIG. 2 and FIG. 5 respectively. As shown in FIG. 2, the FBMC modulator (140) consists of the following blocks:

1. A pre-processing stage block (141, which prepares the input complex symbols ($x_1(n), \ldots, x_M(n)$) for its frequency translation. For example, if OQAM modulation is employed, this stage would stagger the real and imaginary parts of the transmitted symbols in the time domain, which could then be multiplied by an appropriate complex weight, see also [P. Siohan, C. Siclet, and N. Lacaille, "*Analysis and design of OFDM/OQAM systems based on filterbank theory*", IEEE Transactions on Signal Processing, vol. 50, no. 5, pp. 1170-1183, May 2002].

2. A frequency translation operation block (142) that up-converts the samples at each of the M branches to a set of M distinct frequencies, denoted here as f1, f2, . . . , fM. This frequency translation operation block (142) is typically implemented with an IFFT operation.

3. A first filterbank (143) consisting of M parallel filters that implement the pulse shaping.

4. A network of reconstruction (144), basically consisting of delay and sum and decimation operations, which transform the signal into an appropriate stream to be transmitted.

There exist multiple options in the art in order to construct these different blocks (141, 142, 143, 144). In any case, the objective of the FBMC modulator is always the generation of a digital signal consisting of a linear combination of the input symbol streams ($x_1(n), \ldots, x_M(n)$) such that the effective frequency response experimented by the $m^{th}$ bit stream is proportional to P(f−fn), where P(f) is a prototype response fixed by the system and fn is the frequency used for the up-conversion of the nth symbol stream in frequency translation operation block (142).

Figure 3:
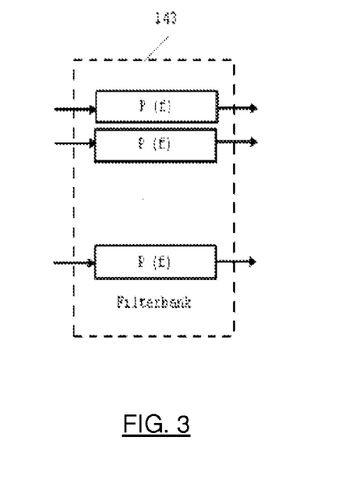
FIG. 3 shows the typical structure of the filterbank, constructed from a prototype filter P(f), shown in FIG. 2.

FIG. 3 shows the structure of the first filterbank (143), implemented from parallel set of filters $P_1(f), P_2(f), \ldots$ (143). Typically, the $k^{th}$ filter $P_k(f)$ is obtained as a decimated version of an original one—referred to as "prototype" in the art and denoted here by P(f)—after translation to the $k^{th}$ subcarrier frequency fk, that is $P_k(f)$ is a decimated version of P(f−fk). If OQAM modulations are used in (130), the decimation factor is usually equal to half of the number of subcarriers (M/2).

Figure 4:
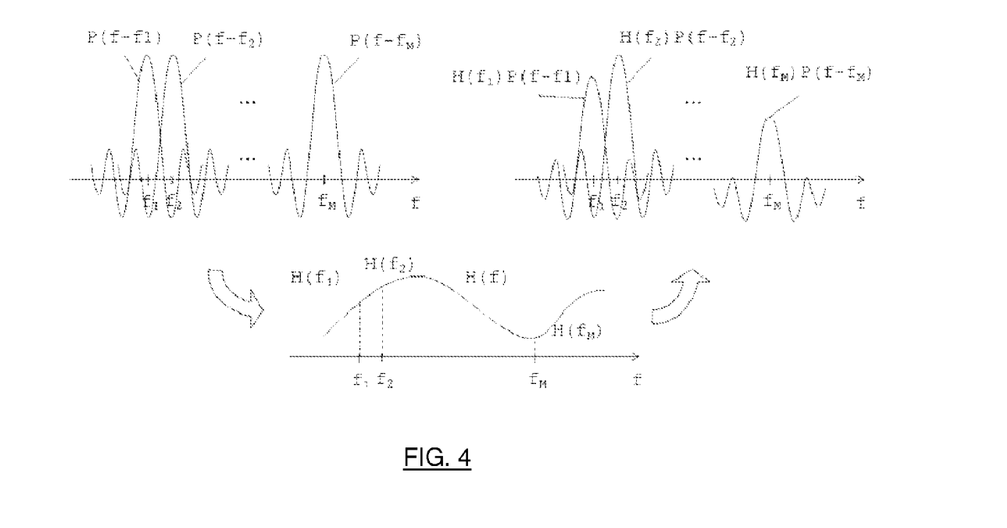
FIG. 4 represents the spectral response of the multiple parallel symbol streams at the output of the filterbank based multicarrier communications (FBMC) modulator and approximate response to a frequency selective channel, according to the present invention.

FIG. 4 represents the typical spectral response experimented by the multiple parallel symbol streams ($x_1(n), \ldots, x_M(n)$) and measured at the output of the FBMC modulator (140). The $n^{th}$ symbol stream goes through a linear channel whose frequency response is proportional to P(f−fn), which is equal to a prototype frequency response P(f) centred at frequency f=fn.

FIG. 5 represents the typical structure of the FBMC demodulator (block 420). After a serial to parallel reconstruction stage at block 421 that basically implements the inverse of network of reconstruction block (144), a second filterbank (422) is implemented built up from a set of M parallel filters (not shown). Each of these M parallel filters is essentially implementing the matched filter of the corresponding branch at the first filterbank (143). In other words, if $P_m(f)$ denotes the frequency response of the $m^{th}$ branch filter in the first filterbank (143), the corresponding filter in the $m^{th}$ branch of the second filterbank (422) has a frequency response proportional to $P_m^*(f)$, where (●)* denotes complex conjugate.

Following the said second filterbank (422), a frequency down-conversion module (423), typically implemented via an FFT/IFFT operation, converts the multiple symbol streams down to their baseband equivalents. The final post-processing stage (424) prepares the received samples for the equalizer, and basically inverts some of the operations made by the pre-processing stage (141). It should be pointed out that there exist computationally efficient ways of implementing FBMC demodulator (420), most notably the "polyphase implementation" constructed via FFT/IFFT as shown in [P. Siohan, C. Siclet, and N. Lacaille, "*Analysis and design of OFDM/OQAM systems based on filterbank theory*", IEEE Transactions on Signal Processing, vol. 50, no. 5, pp. 1170-1183, May 2002].

The prototype frequency response P(f) is typically designed so that the concatenation of the FBMC modulator (140) followed by the FBMC demodulator (420) produces no distortion or cross-talk between the M different branches of the system. In other words, the filter frequency responses Pm(f), m=1, . . . , M, are implemented to make sure that in the presence of an ideal distortion-free channel in the transmission media (200), the output signals $y_1(n), \ldots, y_M(n)$ are proportional to the input ones $x_1(n), \ldots, x_M(n)$. These are usually referred to as perfect reconstruction conditions. When P(f) is even and real-valued and M is an even number, a universal set of reconstruction conditions can be derived for multiple types of filterbank modulations (such as Cosine filterbank modulations [T. Q. Nguyen, R. D. Koilpillai, "*The theory and design of arbitrary-length cosine-modulated filter banks and wavelets, satisfying perfect reconstruction*" IEEE Transactions on Signal Processing, vol. 44, pp. 473-483, Mar. 1996], Modified DFT modulations [T. Karp, N. J. Fliege, "*MDFT filter banks with perfect reconstruction*", Proc. Of the IEEE International Symposium on Circuits and Systems, vol. 1, Seattle, Wash., Apr. 1995, pp. 744-747] or OFDM/OQAM modulations [P. Siohan, C. Siclet, and N. Lacaille, "*Analysis and design of OFDM/OQAM systems based on filterbank theory*," IEEE Transactions on Signal Processing, vol. 50, no. 5, pp. 1170-1183, May 2002]). When the same prototype pulse is used at both sides of the communication system, the pulse is designed to present even symmetry and the decimation factor is half of the number of subcarriers (M/2), these conditions can be formulated as:

$$P_m(f)P_m^*(-f)+P_{m+M/2}(f)P_{m+M/2}^*(-f)=1, m=1,\ldots,M. \quad (1)$$

We will consider here that perfect reconstruction conditions are met, so that in the presence of an ideal, noiseless and distortion-free channel, the signals at the output of the FBMC demodulator (420) are proportional to those at the input of the FBMC modulator (140).

The situation is very different in the presence of a non-ideal frequency selective noisy channel. Let H(f) denote the channel frequency response of the transmission media (200). If the number of carriers M is sufficiently large and P(f) is sufficiently narrow in the frequency domain (see FIG. 4), we will approximately have $$P(f-fm)P(f-fk)\approx 0 \quad (2)$$

for k≠m. In this situation, the effect of the channel on each of the M parallel streams will approximately be equivalent to the multiplication by a complex weight, given by the channel response at the corresponding frequency. More specifically, we will approximately have $$y_m(n) \approx H(fm)x_m(n) + w_m(n) \quad (3)$$

where $w_m(n)$ is a noise term caused by the transmission media (200). In this case, the equalizers (425) can be implemented in a very simple way via multiplication by the inverse of the corresponding coefficient, namely $H^{-1}(fm)$. In other words, the output of the $m^{th}$ branch equalizer will be obtained by $$z_m(n) = H^{-1}(fm)y_m(n) \approx x_m(n) + H^{-1}(fm)w_m(n) \quad (4)$$

which is equal to the transmitted symbols $x_m(n)$ plus some noise term.

Unfortunately, the approximations in (2)-(3) only hold for very high M and very narrow P(f). In practice, we will have $P(f-fm)P(f-fk) \neq 0$ and consequently the output of FBMC demodulator will approximately be equal to $$y_m(n) \approx H(fm)x_m(n) + e_m(n) + w_m(n) \quad (5)$$

where $e_m(n)$ is an additional term that contains inter-symbol and inter-carrier interference, and that depends on the channel H(f) and the prototype P(f). This term will disappear when M increases to infinity, but in practice it will present a very high magnitude for moderate values of M, as it is the case in practical situations. In fact, the presence of this term has spurred a lot of research on alternative equalization systems that try to cancel out its contribution.

The proposed invention consists of a demodulator/equalizer architecture for FBMC modulations under frequency selective channels. The equalizer architecture consists of multiple parallel stages that are linearly combined on a per-subcarrier basis. The traditional single tap per-subcarrier equalizer is obtained as a special case of the proposed equalizer when the number of stages is fixed to one. Both simulations and analytical predictions indicate that high performance gains can be obtained by simply complementing the traditional single tap per-subcarrier equalizer with an additional parallel stage, that is by using only K=2 stages.

Figure 6:
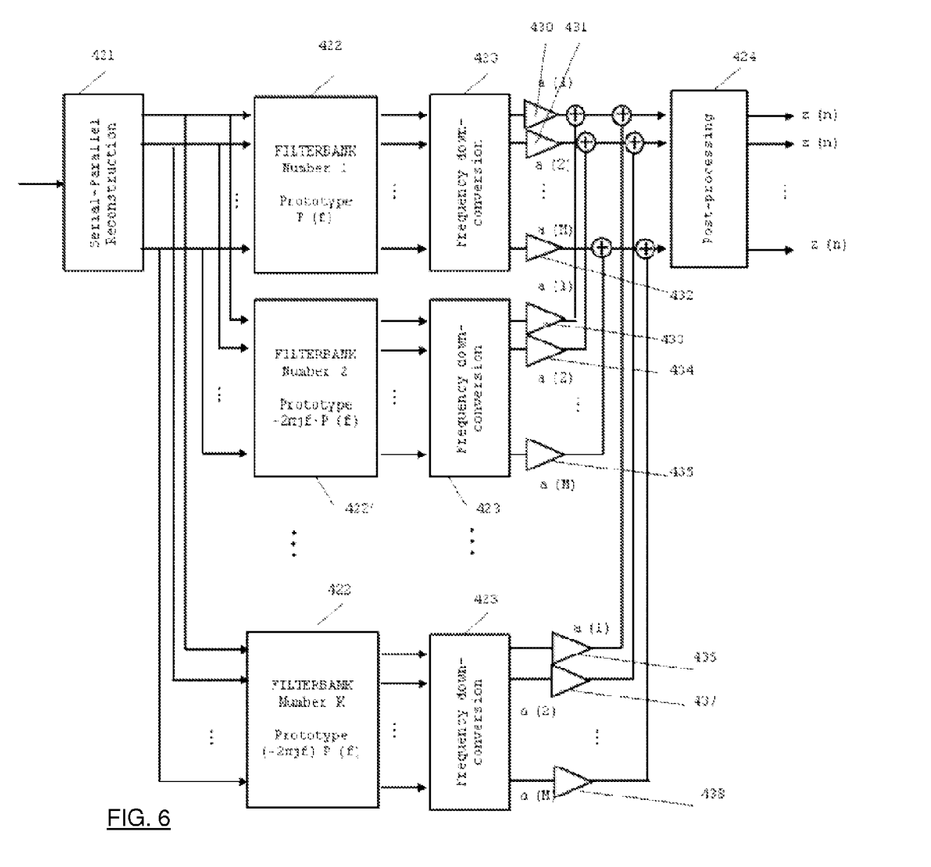
FIG. 6 shows a block diagram of the proposed FBMC demodulator of FIG. 1, according to the present invention.

The proposed demodulator-equalizer architecture is shown in FIG. 6. It corresponds to the block 420 in FIG. 1. The receiver architecture consists of K parallel stages, where K is a natural number. The traditional receiver in FIG. 5 corresponds to the case K=1, so in general we consider K>1. As in the conventional receiver, the incoming signal is passed through a serial-to-parallel converter (421), and the result is filtered by K second filterbanks (422, 422', 422") in parallel. Each second filterbank (422) is constructed using a different prototype filter. The first one of the second filterbanks (422) is constructed using the conjugate of the original prototype filter used at the transmitter in the frequency domain (P*(f)). The other second filterbanks (422') are constructed in the same way, but using the successive derivatives in the time domain of the original prototype pulse. Therefore, for example, the second one of the second filterbanks (422') is constructed using as prototype the filter $-j2\pi f P^*(f)$ in the frequency domain, where j is the imaginary unit. Similarly, the second filterbank (422") used in the $k^{th}$ parallel branch is constructed using the prototype $(-j2\pi f)^{(k-1)} P^*(f)$.

After filtering by the K different second filterbanks (422, 422', 422"), the signal at each parallel branch is frequency down-converted (typically using a FFT operation), at down-converters (423). Afterwards, the signal is combined in a per-subcarrier basis using some coefficients that will be defined below. The result is then optionally post-processed at post-processor (424), which is exactly the same block that would be used in the conventional demodulator.

To combine the signals from the K different parallel stages, the proposed system uses some coefficients $a_k(m)$, k=1, ..., K, m=1, ..., M, so that the $m^{th}$ subcarrier in the $k^{th}$ parallel stage is multiplied by the coefficient $a_k(m)$. The coefficients used to combine the signals coming from the m subcarrier can be chosen recursively as follows:
Initialization:

$$a_1(m) = \frac{1}{H(f_m)}$$

(as in the traditional per-subcarrier single tap equalizer)
For k=2:K, $$a_k(m) = -\frac{1}{H(f_m)} \sum_{r=0}^{k-1} \frac{(-j)^{k-r}}{(k-r)!} H^{(k-r)}(f_m) a_r(m)$$

Where $H^{(k)}(f_m)$ denotes the $k^{th}$ derivative of the channel (in the frequency domain) evaluated at the frequency $f_m$.

Table I presents a computational complexity assessment of the FBMC receiver (400) including several types of equalizers in terms of real-valued multiplications and additions, assuming that the number of carriers M is a power of two and that the polyphase implementation in [P. Siohan, C. Siclet, and N. Lacaille, "*Analysis and design of OFDM/OQAM systems based on filterbank theory*", IEEE Transactions on Signal Processing, vol. 50, no. 5, pp. 1170-1183, May 2002] is used to implement the receive filterbanks (422, 422', 422").

TABLE I

| Equalizer | Real-valued multiplications | Real-valued additions |
|---|---|---|
| Single-tap per-subcarrier | M (log$_2$(M/2) + 2k + 2) + 4 | M (3log$_2$(M/2) + 2k) + 4 |
| Proposed (K > 1 stages) | M (log$_2$(M/2) + 2k + 2)K + 4K | M (3log$_2$(M/2) + 2k + 2)K − 4M + 4K |
| FIR (Ntaps), per-subcarrier | M (log$_2$(M/2) + 2k + 4Ntaps + 2)K + 4 | M (3log$_2$(M/2) + 2k + 4Ntaps − 2)K + 4 |
| FIR (Ntaps), multi-band (Nf bands) | M (log$_2$(M/2) + 2k + 4Nf · Ntaps + 2)K + 4 | M (3log$_2$(M/2) + 2k + 4Nf · Ntaps − 2)K + 4 |

Table 1 Computational complexity of the proposed algorithm under the polyphase implementation and comparison with classical techniques. Here k is the overlapping factor of the prototype pulse, defined as the quotient between its length in the time domain and the length of a multicarrier symbol, M is the number of subcarriers, and K the number of parallel stages of the proposed system.

These values can easily be derived by noticing that each FFT operation can be carried out with M(log$_2$(M/2)−2)+4 multiplications and 3M(log$_2$(M/2)−2)+4 additions, see further [P. Duhamel and M. Vetterli, "*Fast Fourier transforms: A tutorial review and a state of the art*", Signal Processing, vol. 19, pp. 259-299, 1990]. Apart from the single-tap per-subcarrier equalizer and the proposed equalizer (with K>1 stages), Table I also includes the computational complexity corresponding to two standard equalization algorithms for FBMC modulations: a per-subcarrier equalizer that uses a finite impulse response (FIR) filter at each subcarrier, and a multi-band equalizer that processes Nf subcarriers with Nf FIR filters. In both cases, all the FIR filters were assumed to consist of a total of Ntaps complex coefficients. It is illustrated below that, according to Table I, the proposed equalization algorithm presents a much lower computational complexity for practical values of K, M, Ntaps, Nf.

Figure 7:
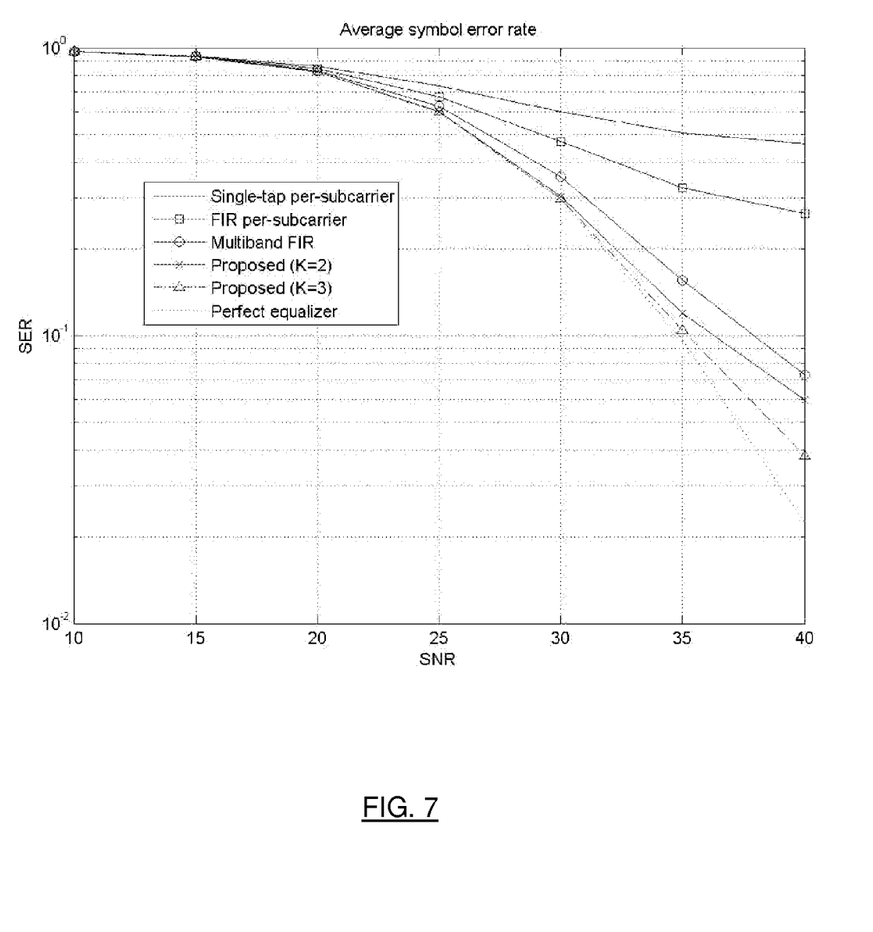
FIG. 7 is a graphic that shows the performance of an equalizer according to the present invention, in terms of symbol error rate as a function of the signal to noise ratio for different values of the number of parallel stages.

FIG. 7 represents the average symbol error rate that is achieved by different equalization systems in a filterbank multicarrier system with 256 carriers with prototype pulses having perfect reconstruction conditions and employing a 1024-QAM modulation at each subcarrier. The channel impulse response was randomly generated with a finite impulse response of 20 taps, having an exponentially decaying power delay profile (decaying constant equal to 0.3).

Apart from the performance of the proposed equalization method for different values of K (K=1,2,3, whereby K=1 corresponds to the single tap per-subcarrier equalizer, solid line with no markers), FIG. 7 also shows the performance of a complex FIR per-subcarrier equalizer with Ntaps=8 coefficients (solid line with star markers), as well as the performance of a multi-band complex FIR that processes the two adjacent subcarriers, namely Ntaps=8, Nf=3 (solid line with circle markers). For the per-subcarrier FIR equalizer, the coefficients of the filters where chosen to perfectly equalize a total of Ntaps equispaced points of the subcarrier frequency response. For the multi-band FIR equalizer, the coefficients were chosen so as to minimize the total distortion at the output of the equalizer, evaluated at Ntaps equispaced points of each subcarrier bandwidth. Observe that the proposed method with K=2 (solid line with star markers) and K=3 (dash-dotted line with triangle markers) outperform both classical schemes and work very close to the perfect equalizer (dotted line with no markers).

It must be pointed out that, according to Table I, the computational complexity of the per-subcarrier FIR equalizer with Ntaps=8 is approximately twice the complexity of the proposed approach with K=2 stages in the total number of algebraic operations. The computational advantage is even higher in the case of the multi-band FIR equalization scheme, which needs a total number of operations approximately three times higher than those needed by the proposed scheme with K=2 stages. From all this, it is concluded that the proposed equalization architecture represents a clear improvement with respect to standard approaches in terms of both better performance and lower computational complexity.

The invention claimed is:

1. Method for equalizing filterbank based multicarrier modulations, comprising the steps of:
   a. serial-to-parallel converting the received signal at a serial-to-parallel converter (421) into a first plurality (M) of parallel streams of subcarriers;
   b. processing each subcarrier of the first plurality (M) of parallelized subcarrier signals by a second plurality (K) of parallel second filterbanks (422, 422', 422'', . . . ), wherein said processing of the subcarrier signals is performed using a filter generated by frequency translation of an original filter hereinafter referred to as "prototype", and where the prototype for each of the parallel second filterbanks is obtained by performing successive time-domain derivatives of the original filter; and
   c. weighting the output of said K parallel second filterbanks with weights (430, 431, . . . ) in order to form a new set of M signals.

2. Method according to claim 1, wherein the second parallel filterbanks (422, 422', 422'', . . . ) are constructed using an approximation to the time-domain derivatives of the original prototype.

3. Method according to claim 1, wherein each filterbank (422', 422'', . . . ) is constructed using a polyphase network employing an FFT or IFFT operation.

4. Method according to claim 1, further comprising the step of further processing and/or equalizing the signals that result after combining the outputs of the K parallel second filterbanks.

5. Method according to claim 4, where the equalization associated with a subcarrier consists of a filtering operation.

6. Method according to claim 4, where the equalization associated with a subcarrier consists of a single tap multiplication by an appropriate weight.

7. Method according to claim 4, where the equalization associated with a subcarrier consists of a single tap multiplication by the inverse of the channel frequency response at the subcarrier frequency.

8. Method for equalizing filterbank based multicarrier modulations, comprising the steps of:
   a. serial-to-parallel converting the received signal at a serial-to-parallel converter (421) into a first plurality (M) of parallel streams of subcarriers;
   b. processing each subcarrier of the first plurality (M) of parallelized subcarrier signals by a second plurality (K) of parallel second filterbanks (422, 422', 422'', . . . )
   c. weighting the output of said K parallel second filterbanks with weights (430, 431, . . . ) in order to form a new set of M signals; and
   d. further processing and/or equalizing the signals that result after combining the outputs of the K parallel second filterbanks;
   wherein the equalization associated with a subcarrier consists of a single tap multiplication by the inverse of the channel frequency response at the subcarrier frequency and the weights used to combine the output from the K parallel first filterbanks (422, 422', 422'', . . . ) of the M signals in each one is fixed for one filterbank and is allocated a value defined by the expression:

$$a_k(m) = -\frac{1}{H(f_m)} \sum_{r=0}^{k-1} \frac{(-j)^{k-r}}{(k-r)!} H^{(k-r)}(f_m) a_r(m)$$

for the generic $k^{th}$ filterbank, wherein H(fm) denotes the channel frequency response at the $M^{th}$ subcarrier frequency, and $H^{(k)}$(fm) denotes the $k^{th}$ frequency domain derivative of the channel response at the $m^{th}$ subcarrier frequency.

9. Method according to claim 8, wherein H(fm) and $H^{(k)}$ (fm), k=1, . . . , K are replaced by estimations or approximations thereof.

10. Method according to claim 8, wherein the m subcarrier output of the kth filterbank is multiplied by the weight $a_k$(m), k=1, . . . , K, m=1, . . . , M, and where the resulting signals are added on a per-subcarrier basis.

11. Method according to claim 1, wherein the second plurality (K) of parallel second filterbanks is fixed beforehand according to the channel frequency response.

12. A system comprising a processor operatively connected to a digital data storage medium storing instructions for performing the method of claim 1, wherein said instructions are executed by the processor.

* * * * *